(12) United States Patent
Manabe et al.

(10) Patent No.: US 9,370,746 B2
(45) Date of Patent: *Jun. 21, 2016

(54) REVERSE OSMOSIS MEMBRANE SEPARATION DEVICE

(75) Inventors: Atsuyuki Manabe, Ehime (JP); Hayato Watanabe, Ehime (JP); Yukio Noguchi, Ehime (JP)

(73) Assignee: MIURA CO., LTD., Matsuyama (JP)

( * ) Notice: Subject to any disclaimer, the term of this patent is extended or adjusted under 35 U.S.C. 154(b) by 642 days.

This patent is subject to a terminal disclaimer.

(21) Appl. No.: 13/608,249

(22) Filed: Sep. 10, 2012

(65) Prior Publication Data

US 2013/0068674 A1 Mar. 21, 2013

(30) Foreign Application Priority Data

Sep. 20, 2011 (JP) ................................. 2011-205345

(51) Int. Cl.
 *B01D 61/12* (2006.01)
 *C02F 1/44* (2006.01)
 *B01D 61/02* (2006.01)

(52) U.S. Cl.
 CPC .............. *B01D 61/12* (2013.01); *B01D 61/025* (2013.01); *C02F 1/441* (2013.01);
 (Continued)

(58) Field of Classification Search
 CPC ...... C02F 2209/40; C02F 1/008; C02F 1/441; C02F 2209/008; C02F 2209/006; C02F 2209/005; C02F 2209/055; C02F 2209/02; C02F 2209/03; C02F 1/042; C02F 5/00; C02F 2201/46145; C02F 2303/20; B01D 2311/16; B01D 61/12; B01D 61/025; B01D 2311/10; B01D 2311/14; B01D 2311/246; B01D 2311/243; B01D 65/08; B01D 2255/30; B01D 2257/55; B01D 2313/12; B01D 2321/10; B01D 2311/04; B01D 2311/2649; B01D 2311/268; B01D 61/08; B01D 61/58; B01D 65/02; B01D 3/42; B01D 2321/02; B01D 2321/40
See application file for complete search history.

(56) References Cited

U.S. PATENT DOCUMENTS 7,767,077 B2 * 8/2010 Yoneda et al. .................. 210/97
2007/0295650 A1 12/2007 Yoneda et al.
(Continued)

FOREIGN PATENT DOCUMENTS

CN 1268390 A 10/2000
JP H08-309349 A 11/1996
(Continued)

OTHER PUBLICATIONS

Mar. 10, 2015 Office Action issued in Japanese Patent Application No. 2011-205345.
(Continued)

*Primary Examiner* — Lucas Stelling
*Assistant Examiner* — Rohit K Dewan
(74) *Attorney, Agent, or Firm* — Oliff PLC

(57) ABSTRACT

A reverse osmosis membrane separation device includes: a reverse osmosis membrane module; a flow rate detecting unit configured to detect a flow rate of permeate water to output a detected flow rate value corresponding to the flow rate; a pressure pump configured to be driven at a rotation speed corresponding to an input drive frequency and to feed supply water to the reverse osmosis membrane module; an inverter configured to output a drive frequency corresponding to an input current value signal to the pressure pump; and a control unit configured to calculate a drive frequency of the pressure pump by a velocity type digital PID algorithm, such that a detected flow rate value output from the flow rate detecting unit becomes a target flow rate value that is set in advance to output a current value signal corresponding to a calculation value of the drive frequency to the inverter.

3 Claims, 9 Drawing Sheets

(52) U.S. Cl.
CPC ........ *B01D 2311/10* (2013.01); *B01D 2311/14* (2013.01); *B01D 2311/16* (2013.01); *B01D 2311/243* (2013.01); *B01D 2311/246* (2013.01); *C02F 2209/02* (2013.01)

(56) References Cited

U.S. PATENT DOCUMENTS

| | | | | |
|---|---|---|---|---|
| 2008/0035201 A1* | 2/2008 | Roberts | ............................. | 137/5 |
| 2013/0026083 A1* | 1/2013 | Manabe | .................. | C02F 1/008 210/96.2 |

FOREIGN PATENT DOCUMENTS

| JP | 09-034086 A | 2/1997 |
|---|---|---|
| JP | 2003-326259 A | 11/2003 |
| JP | 2005-288220 A | 10/2005 |
| JP | A-2005-296945 | 10/2005 |
| JP | 2006-258513 A | 9/2006 |
| JP | 2006-305500 A | 11/2006 |
| JP | 2007-326065 A | 12/2007 |
| JP | 2008-188540 A | 8/2008 |
| JP | 2009-154070 A | 7/2009 |
| JP | 2009-285522 A | 12/2009 |
| JP | 2010-120015 A | 6/2010 |
| JP | 2010-131579 A | 6/2010 |
| JP | 2011-147899 A | 8/2011 |
| JP | 2011-161445 A | 8/2011 |

OTHER PUBLICATIONS

Jun. 2, 2015 Chinese Search Report issued in Chinese Application No. 201210347793.5.

Jun. 2, 2015 Chinese Office Action issued in Chinese Application No. 201210347793.5.

* cited by examiner

REVERSE OSMOSIS MEMBRANE SEPARATION DEVICE

CROSS-REFERENCE TO RELATED APPLICATION(S)

This application is based upon and claims the benefit of priority from Japanese Patent Application No. 2011-205345, filed on Sep. 20, 2012, the entire contents of which are incorporated herein by reference.

FIELD

The present invention relates to a reverse osmosis membrane separation device.

BACKGROUND

In a semiconductor manufacturing process and washing of electronic parts and medical apparatuses, high-purity pure water that does not contain impurities is used. In general, this type of pure water is produced by performing a reverse osmosis membrane process to raw water such as groundwater and tap water by a reverse osmosis membrane module (hereinafter, also an "RO membrane module").

A water permeability coefficient of a reverse osmosis membrane that is made of a polymer material changes depending on a temperature. A water permeability coefficient of a reverse osmosis membrane also changes due to a block of pores (hereinafter, also a "membrane block") and degradation due to oxidation of a material (hereinafter, also "membrane degradation").

Specifically, a water permeability coefficient of an RO membrane module becomes small when a temperature of supplied water (hereinafter, also "supply water") is low or when a membrane is blocked. Also, a water permeability coefficient of an RO membrane module becomes large when a temperature of supply water is high or when a membrane is degraded.

Therefore, when a pressure pump that delivers supply water to the RO membrane module is operated at a constant operating pressure, a water volume of produced permeate water (pure water) becomes mailer than a required production volume of water, when a temperature of supply water is low or when a membrane is blocked. In this case, a supply volume to a demand position becomes short. When a temperature of supply water is high or when a membrane is degraded, a water volume of permeate water becomes larger than a required production volume of water. In this case, overconcentration occurs easily at a primary side of a reverse osmosis membrane, and this leads to the membrane block.

In order to keep constant a flow rate of permeate water in the RO membrane module regardless of a temperature of supply water or a state of a reverse osmosis membrane, there is proposed a water quality improvement system that performs a flow rate feed-back water volume control. According to this flow rate feedback water volume control, a drive frequency of a pressure pump is controlled by an inverter equipment such that a flow rate of permeate water that is produced by the RO membrane module becomes a target flow rate value.

According to the flow rate feedback water volume control, a flow rate of permeate water can be held at a target flow rate value, even when a water permeability coefficient of the RO membrane module changes depending on a temperature of supply water or a state of a reverse osmosis membrane. However, according to a conventional flow rate feedback water volume control, when a water permeability coefficient of the RO membrane module rapidly changes, it is not possible to sufficiently follow this change, and there is a possibility that a flow rate of permeate water is greatly deviated from the target flow rate value.

SUMMARY OF THE INVENTION

A reverse osmosis membrane separation device comprises: a reverse osmosis membrane module configured to separate supply water into permeate water and concentrated water; a flow rate detecting unit configured to detect a flow rate of permeate water to output a detected flow rate value corresponding to the flow rate; a supply water line for supplying supply water to the reverse osmosis membrane module; a pressure pump configured to be driven at a rotation speed corresponding to an input drive frequency and to pressure feed supply water which passes through the supply water line to the reverse osmosis membrane module; an inverter equipment configured to output a drive frequency corresponding to an input current value signal to the pressure pump; and a control unit configured to calculate a drive frequency of the pressure pump by a velocity type digital PID algorithm, such that a detected flow rate value output from the flow rate detecting unit becomes a target flow rate value that is set in advance to output a current value signal corresponding to a calculation value of the drive frequency to the inverter equipment.

DETAILED DESCRIPTION OF PREFERRED EMBODIMENTS

First Embodiment

Figure 1:
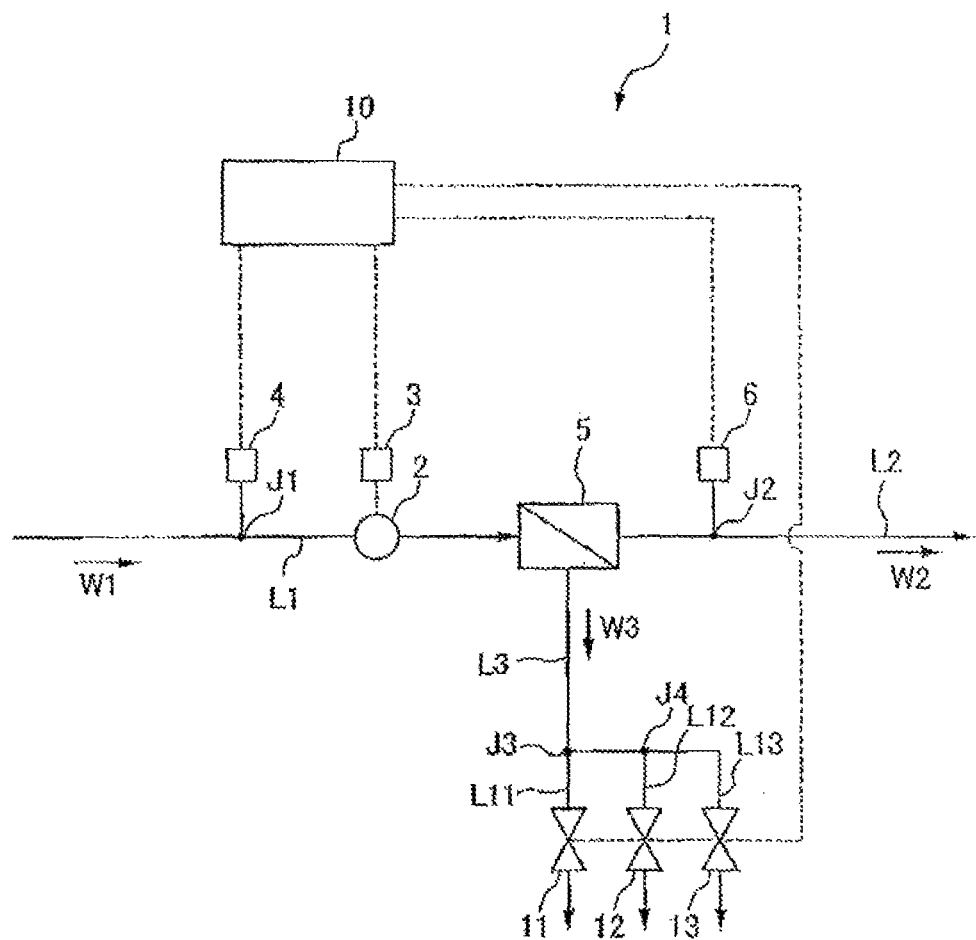
FIG. 1 is an exemplary overall configuration diagram of a reverse osmosis membrane separation device according to a first embodiment of the present invention.
Figure 2:
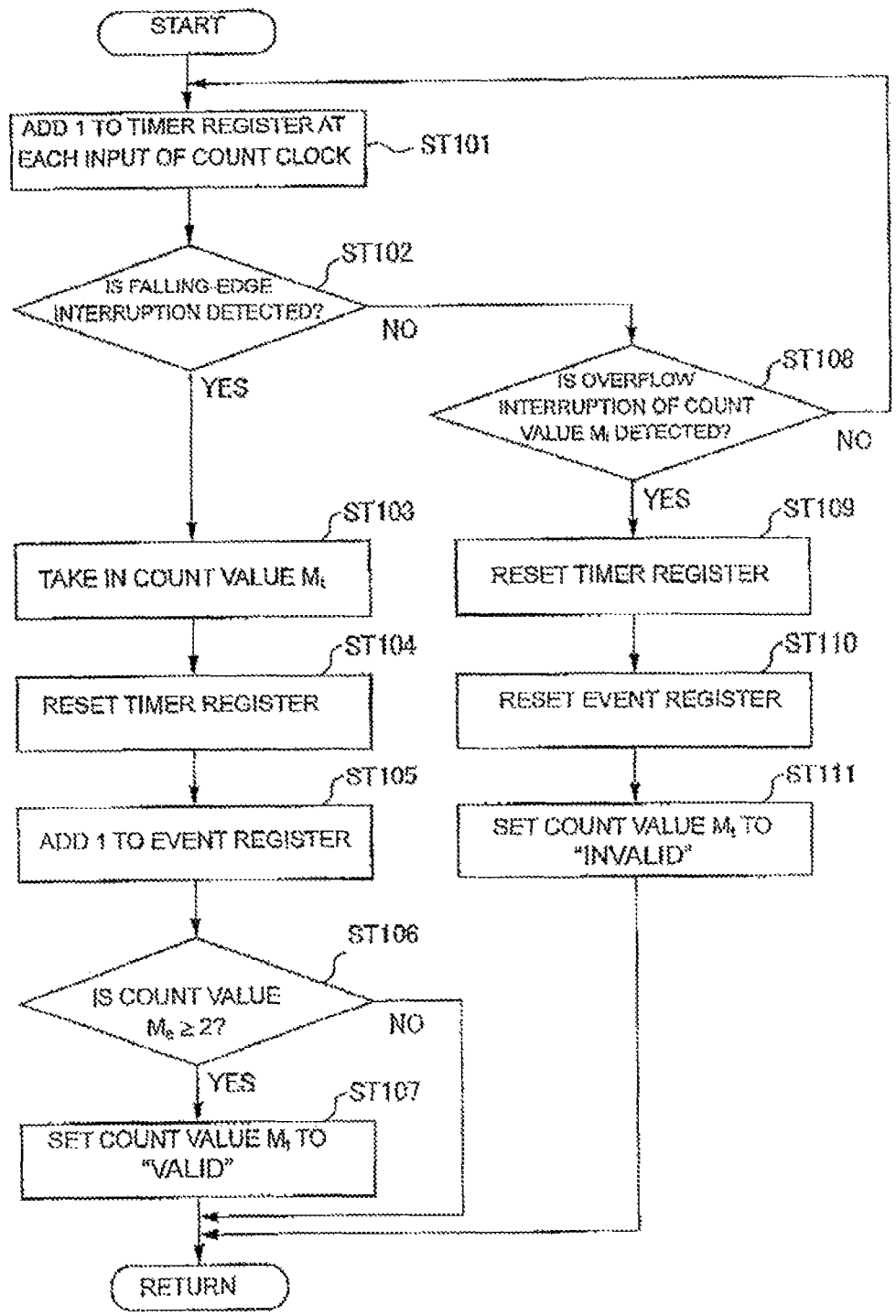
FIG. 2 is an exemplary flowchart showing a processing procedure employed when a control unit calculates a time width of a flow rate pulse signal in the first embodiment.
Figure 3:
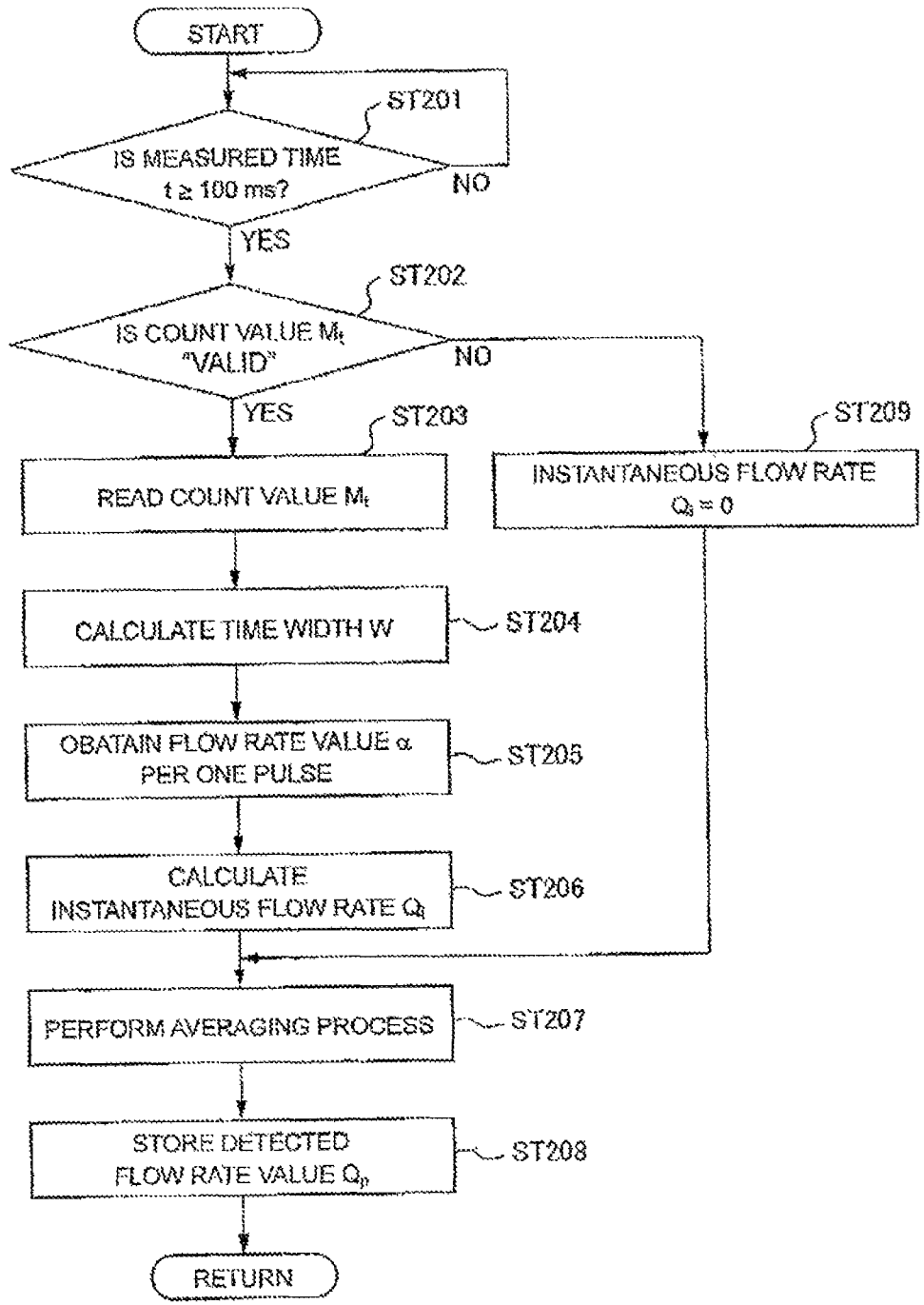
FIG. 3 is an exemplary flowchart showing a processing procedure employed when the control unit calculates a detected flow rate value as numerical information in the first embodiment.
Figure 4:
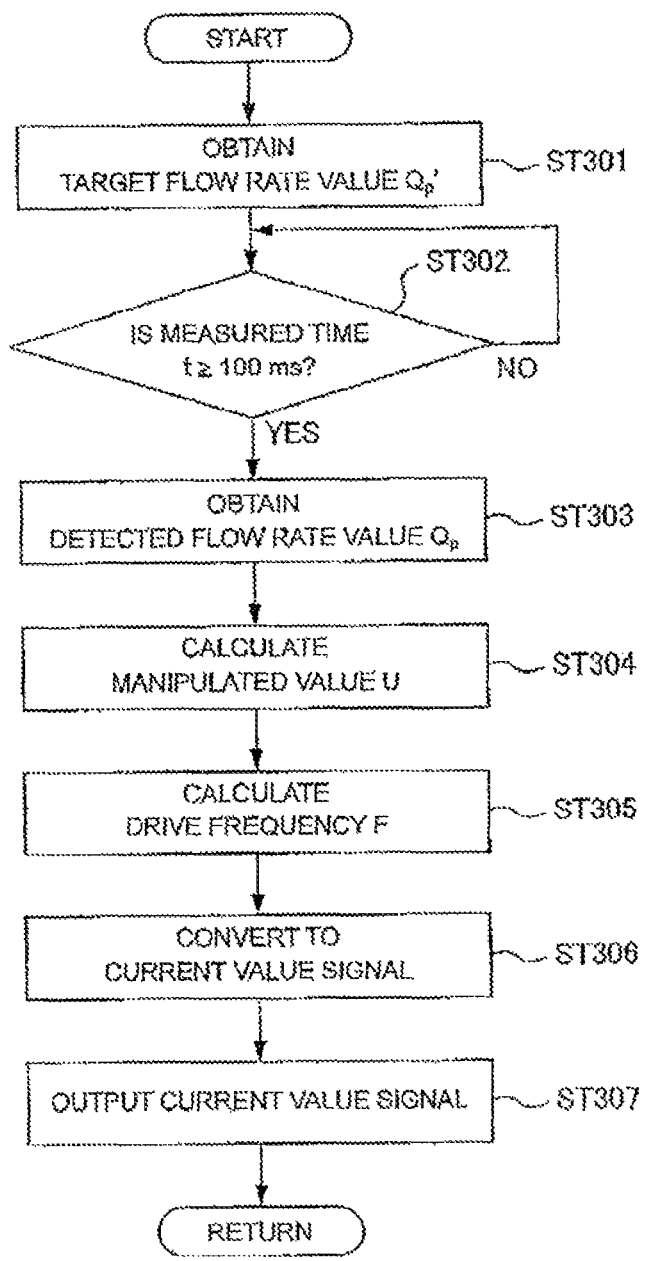
FIG. 4 is an exemplary flowchart showing a processing procedure employed when the control unit performs a flow rate feedback water volume control in the first embodiment.
Figure 5:
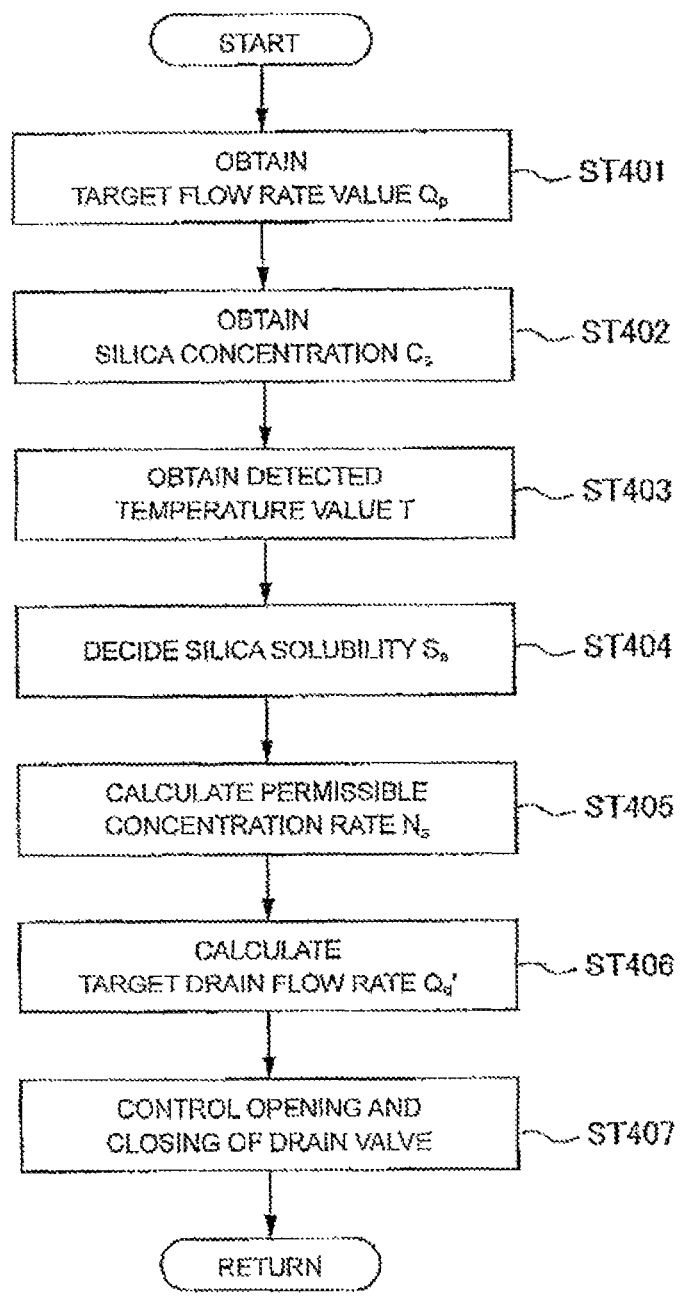
FIG. 5 is an exemplary flowchart showing a processing procedure employed when the control unit performs a temperature feedforward recovery rate control in the first embodiment.

A reverse osmosis membrane separation device 1 according to a first embodiment of the present invention is described with reference to the drawings. An object of the first embodiment is to provide a reverse osmosis membrane separation device 1 that can keep a flow rate of permeate water at a target flow rate value, even when a water permeability coefficient of an RO membrane module rapidly changes. The reverse osmosis membrane separation device 1 according to the first embodiment is applied to a pure water production system that produces pure water from fresh water, for example. FIG. 1 is an overall configuration diagram of the reverse osmosis membrane separation device 1 according to the first embodiment. FIG. 2 is a flowchart showing a processing procedure employed when a control unit 10 calculates a time width, of a flow rate pulse signal. FIG. 3 is a flowchart showing a processing procedure employed when the control unit 10 calculates a detected flow rate value as numerical information. FIG. 4 is a flowchart showing a processing procedure employed when the control unit 10 performs a flow rate feedback water volume control. FIG. 5 is a flowchart showing a processing procedure employed when the control unit 10 performs a temperature feedforward recovery rate control.

As shown in FIG. 1, the reverse osmosis membrane separation device 1 according to the first embodiment includes a pressure pump 2, an inverter equipment 3, a temperature sensor 4 as a temperature detecting unit, an RO membrane module 5 as a reverse osmosis membrane module, a flow rate sensor 6 as a flow rate detecting unit, the control unit 10, and a first drain valve 11 to a third drain valve 13 as drain valves. In FIG. 1, an electric connection path is indicated, by a broken line (this is similarly applied to FIGS. 6 and 8 described later).

The reverse osmosis membrane separation device 1 also includes a supply water line L1, a permeate water line L2, a concentrated water line L3, and drain lines of concentrated water W3 (a first drain line L11, a second drain line L12, and a third drain line L13). The "line" in the present specification is a generic term of a line through which a fluid can pass such as a flow path, a channel, and a duct.

The supply water line L1 is a line for supplying supply water W1 to the RO membrane module 5. An end portion of an upstream side of the supply water line L1 is connected to a supply source (not shown) of supply water W1. An end portion of a downstream side of the supply water line L1 is connected to a primary-side input port of the RO membrane module 5.

The pressure pump 2 is a device that takes in the supply water W1 and discharges the supply water W1 to the RO membrane module 5. The pressure pump 2 is electrically connected to the inverter equipment 3 (described later). Frequency-converted drive power is input to the pressure pump 2 from the inverter equipment 3. The pressure pump 2 is driven at a rotation speed corresponding to a frequency of supplied drive, power (hereinafter, also "Drive frequency").

The inverter equipment 3 is an electric circuit that supplies the frequency-converted drive power to the pressure pump 2. The inverter equipment 3 is electrically connected to the control unit 10. A current value signal is input to the inverter equipment 3 from the control unit 10. The inverter equipment 3 outputs drive power of a drive frequency corresponding to an input current value signal input from the control unit 10, to the pressure pump 2.

The temperature sensor 4 is a device that detects a temperature of the supply water W1. The temperature sensor 4 is connected to the supply water line L1 at a junction portion J1. A junction portion J1 is arranged between a supply source (not shown) of the supply water W1 and the pressure pump 2. The temperature sensor 4 is also electrically connected to the control unit 10. A temperature (hereinafter, also a "detected temperature value") of the supply water W1 detected by the temperature sensor 4 is transmitted to the control unit 10 as a detection signal.

The RO membrane module 5 is a facility that performs a membrane separation process of separating the supply water W1 discharged from the pressure pump 2 into permeate water W2 from which dissolved water is removed and concentrated water W3 in which dissolved salt is concentrated. The RO membrane module 5 includes single or plural RO membrane elements (not shown). The RO membrane module 5 performs a membrane separation process of the supply water W1 by the RO membrane elements, and produces the permeate water W2 and the concentrated water W3.

The permeate water line L2 is a line for delivering the permeate water W2 produced by the RO membrane module 5 to a demand destination. An end portion of an upstream side of the permeate water line L2 is connected to a secondary-side port of the RO membrane module 5. An end portion of a downstream side of the permeate water line L2 is connected to a device or the like of a demand destination (not shown).

The flow rate sensor 6 is a device that detects a flow rate of the permeate water W2 which passes through the permeate water line L2. For the flow rate sensor 6, a pulse transmission type flow rate sensor can be used that has an axial flow impeller or a tangential impeller (not shown) arranged in a flow path housing, for example. The flow rate sensor 6 is connected to the permeate water line L2 at a junction portion J2. The flow rate sensor 6 is electrically connected to the control unit 10. The flow rate of the permeate water W2 detected by the flow rate sensor 6 (hereinafter, also a "detected flow rate value") is transmitted to the control unit 10 as a pulse signal.

The pulse transmission type flow rate sensor that is used in the present embodiment includes an impeller of which front end portions of an even number of wings are alternately magnetized to the North pole and the South pole. The pulse transmission type flow rate sensor outputs a pulse signal of a time width that is proportional to a flow velocity of the permeate water W2, by detecting a rotation of the impeller with a Hall integrated circuit. The Hall integrated circuit is an electronic circuit in which a voltage regulator, Hall elements, an amplifier circuit, a Schmitt trigger circuit, an output transistor, and the like are packaged. The Hall integrated circuit outputs a rectangular wave pulse signal each time when the impeller makes one rotation, in response to a magnetic flux change following a rotation movement of the impeller. The time width of a pulse signal is a time from a last falling edge to a next falling edge of the rectangular wave pulse signal, and this corresponds to a time when the impeller makes one rotation. That is, the time width of the pulse signal becomes short as a flow velocity of the permeate water W2 is higher (as a flow rate is higher), and becomes long as a flow velocity of the permeate water W2 is lower (as a flow rate is lower).

The concentrated water line L3 is a line for transmitting the concentrated water W3 from the RO membrane module 5. An end portion of an upstream side of the concentrated water line L3 is connected to a primary-side exit port of the RO membrane module 5. A downstream side of the concentrated water line L3 is branched to a first drain line L11, a second drain line L12, and a third drain line L13, at junction portions J3 and J4.

The first drain valve 11 is provided in the first drain line L11. A second drain valve 12 is provided in the second drain line L12. A third drain valve 13 is provided in the third drain line L13. The first drain valve 11 to the third drain valve 13 are valves for adjusting a drain flow rate of the concentrated water W3 discharged from a concentrated water drain line L4 to the outside of the device.

The first drain valve 11 can be operated to open and close the first drain line L11. The second drain valve 12 can open and close the second drain line L12. The third drain valve 13 can open and close the third drain line L13.

The first drain valve 11 to the third drain valve 13 include constant flow rate valve mechanisms (not shown) respectively. The constant flow rate valve mechanisms are set to mutually different flow rate values in the first drain valve 11 to the third drain valve 13, respectively. For example, the first drain valve 11 has a drain flow rate set such that a recovery rate of the RO membrane module 5 becomes 95% in an open state. The second drain valve 12 has a drain flow rate set such that a recovery rate of the RO membrane module 5 becomes 90% in an open state. The third drain valve 13 has a drain flow rate set such that a recovery rate of the RO membrane module 5 becomes 80% in an open state.

A drain flow rate of the concentrated water W3 discharged from the concentrated water line 13 can be adjusted at stages by selectively opening and closing the first drain valve 11 to the third drain valve 13. For example, only the second drain valve 12 is set to an open state, and the first drain valve 11 and the third drain valve 13 are set to a closed state. In this case, a recovery rate of the RO membrane module 5 can be set to 90%. Further, the first drain valve 11 and the second drain valve 12 are set to an open state, and only the third drain valve 13 is set to a closed state. In this case, a recovery rate of the RO membrane module 5 can be set to 85%. Therefore, in the present embodiment, the drain flow rate of the concentrated water W3 can be adjusted for each 5% at stages at a recovery rate between 65% and 95%, by selectively opening and closing the first drain valve 11 to the third drain valve 13.

The first drain valve 11 to the third drain valve 13 are electrically connected to the control unit 10, respectively. Opening and closing of valve elements of the first drain valve 11 to the third drain valve 13 are controlled by a drive signal from the control unit 10.

The control unit 10 is configured by a microprocessor (not shown) that includes a CPU and a memory. The control unit 10 calculates a drive frequency to drive the pressure pump 2, by the velocity type digital PID (P: proportional, I: integral, D: derivative) algorithm, such that a detected flow rate value of the flow rate sensor 6 becomes a target flow rate value that is set in advance, as the flow rate feedback water volume control, and outputs a current value signal corresponding to a calculation value of the drive frequency to the inverter equipment 3. The flow rate feedback water volume control by the control unit 10 is described later.

The control unit 10 replaces the detected flow rate value that is input as a pulse signal, with a detected flow rate value as numerical information, and uses the numerical information for the flow rate feedback water volume control. That is, because the target flow rate value in the flow rate feedback water volume control is set as numerical information, a detected flow rate value to be compared is converted to numerical information. In this calculation process, the control unit 10 calculates an instantaneous flow rate in a predetermined cycle, by using a flow rate value per one pulse that is set in advance, while measuring a time width of the input pulse signal. Then, the control unit 10 samples nearest six calculated instantaneous flow rates (sample values), averages (hereinafter, also an "averaging process") two values, after subtracting maximum-side two values and minimum-side two values, and uses a numerical value obtained by this averaging process, as a detected flow rate value. A detailed example of a calculation process of a detected flow rate value by the control unit 10 is described later.

The control unit 10 performs a recovery rate control of the permeate water W2, based on a temperature of the supply water W1 (hereinafter, also "temperature feedforward recovery rate control"). The temperature feedforward recovery rate control is performed in parallel with the flow rate feedback water volume control. The temperature feedforward recovery rate control by this control unit 10 is described later.

Next, a process of replacing the detected flow rate value that is input as a pulse signal with the detected flow rate value as numerical information is described in detail with reference to FIGS. 2 and 3. Processes of the flowcharts shown in FIGS. 2 and 3 are repeatedly performed during an operation of the reverse osmosis membrane separation device 1.

FIG. 2 shows a process to measure a time width of a pulse signal. This process is performed by using an input capture function of an integrated timer unit (hereinafter, "ITU") that is built in a microprocessor.

In step ST101, the ITU adds one count value $M_t$ of a timer register at each time of input of a count clock. A frequency of the count clock is set to 19.5 kHz, for example. In this case, the count value $M_t$ of the timer register is added by one at each interval of 51.2 μs.

In step ST102, the ITU determines whether or not an interruption at a falling edge is detected in a pulse signal of the flow rate sensor 6. In step ST102, when the ITU determines that an interruption at a falling edge is detected (YES), the process proceeds to step ST103. In step ST102, when the ITU determines that an interruption at a falling edge is not detected (NO), the process proceeds to step ST108.

In step ST103 (step ST102; YES), the ITU takes the count value $M_t$ of the timer register into a capture register, and performs a capture operation of holding this value.

After the capture operation is performed, in step ST104, the ITU resets the count value $M_t$ of the timer register to zero.

In step ST105, the ITU adds one count value $M_e$ of an event register. The count value $M_e$ of the event register corresponds to the number of times of interruptions of a falling edge.

In step ST106, the ITU determines whether or not the count value $M_e$ of the event register is equal to or larger than two. In step ST106, when the ITU determines that the count value $M_e$ is equal to or larger than two (YES), the process proceeds to step ST107. In step ST106, when the ITU determines that the count value $M_e$ is smaller than two (NO), the process returns to step ST101. When the count value $M_e$ of the event register is smaller than two, there is a possibility that the count value $M_t$ the capture register does not accurately reflect a pulse width. Therefore, a process of step ST107 described later is skipped.

In step ST107 (step ST106; YES), the ITU sets a flag indicating that the count value $M_t$ of the capture register is "valid", and the process returns to step ST101.

In step ST108 (step ST202; NO), the ITU determines whether or not an interruption of overflow is detected in the timer register. An interruption of overflow occurs when the count value $M_t$ of the timer register exceeds an upper limit value (for example, 65535 when the count value is 16 bits), without detecting a falling edge of a pulse signal. That is, the overflow of the timer register may occur when a flow velocity of the permeate water W2 is zero or minimum and also when the impeller of the flow rate sensor 6 does not rotate. In step ST108, when the ITU determines that an interruption of overflow is detected (YES), the process proceeds to step ST109. In step ST108, when the ITU determines that an interruption of overflow is not detected (NO), the process returns to step ST101.

In step ST109 (step ST108; YES), the ITU resets the count value $M_t$ of the timer register to zero.

In step ST110, the ITU resets the count value $M_e$ of the event register to zero.

In step ST111, the ITU sets a flag indicating that the count value $M_t$ of the capture register is "invalid", and the process returns to step ST101.

By performing the processes of step ST101 to step ST111, the capture register always holds the nearest count values $M_t$ from when a last falling edge of a pulse signal is detected to when a next falling edge is detected.

FIG. 3 shows a process to calculate a detected flow rate value as numerical information, based on a measured time width of a pulse signal.

In step ST201 shown in FIG. 3, the control unit 10 determines whether or not a measured time t by the ITU has reached 100 ms as a calculation cycle. In step ST201, when the control unit 10 determines that a time measured by the ITU has reached 100 ms (YES), the process proceeds to step ST202. In step ST201, when the control unit 10 determines that a time measured by the ITU has not reached 100 ms (NO), the process returns to step ST201.

In step ST202 (step ST201; YES), the control unit 10 determines whether or not a flag indicating that the count value $M_t$ of the capture register is "valid" is being set. In step ST202, when the control unit 10 determines that a flag indicating that the count value $M_t$ is "valid" is being set (YES), (that is, when the process of step ST107 in FIG. 2 is being performed), the process proceeds to step ST203. In step ST202, when the control unit 10 determines that a flag indicating that the count value $M_t$ is "valid" is not being set (NO), (that is, when the process of step ST111 in FIG. 2 is being performed), the process proceeds to step ST209.

In step ST203 (step ST202; YES), the control unit 10 performs reading of the count value $M_t$ that is held in the capture register.

In step ST204, the control unit 10 calculates a time width W [s/p] of a pulse signal, by the following Equation (1), by using the count value $M_t$ that is read in step ST203 and the cycle time (51.2 μs) of the count clock.

$$W = 51.2 \times 10^{-6} \times M_t \quad (1)$$

In step ST205, the control unit 10 obtains a flow rate value α [L/p] per one pulse. The flow rate value α per one pulse is a set value that a device manager inputs to a memory of the control unit 10 via a user interface (not shown), for example. The flow rate value α per one pulse is a constant that is determined by a design specification of the flow rate sensor 6.

In step ST206, the control unit 10 calculates an instantaneous flow rate $Q_i$ [L/h] of the permeate water W2, by the following Equation (2), by using the time width W [s/p] of a pulse signal and the flow rate value α [L/p] per one pulse.

$$Q_i = (3600/W) \times \alpha \quad (2)$$

The control unit 10 stores a calculation value into the memory, each time when a latest instantaneous flow rate $Q_i$ is calculated. The memory always stores nearest six calculation values. When a latest instantaneous flow rate $Q_i$ is calculated, an oldest calculation value is deleted, and this is replaced with a latest calculation value.

In step ST207, the control unit 10 samples nearest six calculation values including the latest instantaneous flow rates $Q_i$ as sample values, and averages two values, after subtracting maximum-side two values and minimum-side two values.

In step ST208, the control unit 10 defines a numerical value obtained by this averaging process, as a detected flow rate value $Q_p$, and stores this numerical value into the memory. The process returns to step ST201.

In step ST209 (step ST202; NO), the control unit 10 stores a calculation value of a latest instantaneous volume $Q_i$ into the memory as zero. That is, in the process of step ST209, when overflow of the timer register occurs and when a flag indicating that the count value $M_t$ of the capture register is "invalid" is being set, this is a state that the impeller of the flow rate sensor 6 is not rotating. Therefore, the instantaneous flow rate $Q_i$ is regarded as zero. After step ST209, the process proceeds to step ST207.

By performing the processes of step ST201 to step ST209, a moving average value of the nearest six instantaneous flow rates $Q_i$ is stored into the memory as a latest detected flow rate value $Q_p$ for each a calculation cycle of 100 ms.

Next, the flow rate feedback water volume control by the control unit 10 is described with reference to FIG. 4. The process of the flowchart shown in FIG. 4 is repeatedly performed during an operation of the reverse osmosis membrane separation device 1.

In step ST301 shown in FIG. 4, the control unit 10 obtains the target flow rate value $Q_p'$ of the permeate water W2. The target flow rate value $Q_p'$ is a set value that a system manager inputs to the memory of the control unit 10 via a user interface (not shown), for example.

In step ST302, the control unit 10 determines whether or not a time t measured by the ITU has reached 100 ms as a control cycle (Δt). In step ST302, when the control unit 10 determines that a time measured by the ITU has reached 100 ms (YES), the process proceeds to step ST303. In step ST302, when the control unit 10 determines that a time measured by the ITO has not reached 100 ms (NO), the process returns to step ST302.

In step ST303 (step ST302; YES), the control unit 10 obtains a latest detected flow rate value $Q_p$ as a feedback value. In step ST208 of FIG. 3, the latest detected flow rate value $Q_p$ obtained is a moving average value of the instantaneous flow rate value $Q_i$ that is stored in the memory.

In step ST304, the control unit 10 calculates a manipulated value $U_n$ by the velocity type digital PID algorithm, such that a deviation between the latest detected flow rate value $Q_p$ obtained in step ST303 and the target flow rate value $Q_p'$ obtained in step ST301 becomes zero. In the velocity type digital PID algorithm, a change portion $\Delta U_n$ of a manipulated value is calculated for each control cycle Δt (100 ms), and this is added to a manipulated value $U_{n-1}$ of the last control cycle time point, thereby deciding a manipulated value $U_n$ of a current time point.

Calculation equations that are used in the velocity type digital PID algorithm are expressed by the following Equations (3a) and (3b).

$$\Delta U_n = K_p\{(e_n - e_{n-1}) + (\Delta t/T_i) \times e_n + (T_d/\Delta t) \times (e_n - 2e_{n-1} + e_{n-2})\} \quad (3a)$$

$$U_n = U_{n-1} + \Delta U_n \quad (3b)$$

In Equations (3a) and (3b), Δt denotes a control cycle, $U_n$ denotes an operation volume at a current time point, $U_{n-1}$ denotes an operation volume of the last control cycle time point, $\Delta U_n$ denotes a change portion of an operation volume from the last time to this time, $e_n$ denotes a size of a deviation of a current time point, $e_{n-1}$ denotes a size of a deviation of the last control cycle time point, $e_{n-2}$ denotes a size of a deviation of the second last control cycle time point, $K_p$ denotes a proportional gain, $T_i$ denotes an integration time, and $T_d$ denotes a derivative time. The size en of a deviation at a current time point is obtained by the following Equation (4).

$$e_n = Q_p' - Q_p \quad (4)$$

In step ST305, the control unit 10 calculates a drive frequency F [Hz] of the pressure pump 2, by the following Equation (5), by using the manipulated value $U_n$ at a current time point, and a maximum drive frequency F' (set value of 50 Hz or 60 Hz) of the pressure pump 2.

$$F = U_n/2 \times F' \quad (5)$$

In step ST306, the control unit 10 converts the calculation value of the drive frequency F into a corresponding current value signal (4 to 20 mA). An output value I [mA] of a current value signal is calculated by the following Equation 6), for example. When the drive frequency F is zero, I becomes equal to 4 mA, and when the drive frequency F is the maximum drive frequency F', I becomes equal to 20 mA.

$$I = F/F' \times 16 + 4 \quad (6)$$

In step ST307, the control unit 10 outputs the converted current value signal to the inverter equipment 3. Accordingly, the process of the present flowchart ends (the process returns to step ST101).

In step ST307, after the control unit 10 outputs a current value signal to the inverter equipment 3, the inverter equipment 3 supplies a drive voltage of a frequency that is assigned by the input current value signal, to the pressure pump 2. As a result, the pressure pump 2 is driven at a rotation speed corresponding to the drive frequency that is input from the inverter equipment 3.

Next, the temperature feedforward recovery rate control by the control unit 10 is described with reference to FIG. 5. The process of the flowchart shown in FIG. 5 is repeatedly performed during an operation of the reverse osmosis membrane separation device 1.

In step ST401 shown in FIG. 5, the control unit 10 obtains the target flow rate value $Q_p'$ of the permeate water W2. The target flow rate value $Q_p'$ is a set value that a system manager inputs to the memory via a user interface (not shown), for example.

In step ST402, the control unit 10 obtains Silica ($SiO_2$) concentration $C_s$ of the supply water W1. The silica concentration $C_s$ is a set value that the system manager inputs to the memory via the user interface (not shown), for example. Silica concentration of the supply water W1 can be obtained by analyzing water quality of the supply water W1 in advance. In the supply water line L1, silica concentration of the supply water W1 may be measured by a water quality sensor (not shown).

In step ST403, the control unit 10 obtains a detected temperature value T of the supply water W1 detected by the temperature sensor 4.

In step ST404, the control unit 10 decides the silica solubility $S_s$ in water, based on the obtained detected temperature value T.

In step ST405, the control unit 10 calculates a permissible concentration rate $N_s$ of silica in the concentrated water W3, based on the silica concentration $C_s$ and the silica solubility $S_s$ that are obtained or determined in the preceding step. The permissible concentration rate $N_s$ of silica can be obtained by the following Equation (7).

$$N_s = S_s/C_s \quad (7)$$

For example, when the silica concentration $C_s$ is 20 $mgSiO_2/L$ and also when the silica solubility $S_s$ at 23° C. is 100 $mgSiO_2/L$, the permissible concentration rate $N_s$ becomes "5".

In step ST406, the control unit 10 calculates a drain flow rate (target drain flow rate $Q_d'$) at which a recovery rate becomes a maximum, based on the target flow rate value $Q_p'$ and the permissible concentration rate $N_s$ that are obtained or calculated in the preceding step. The target drain flow rate $Q_d'$ can be obtained by the following Equation (8), $$Q_d' = Q_p'/(N_s - 1) \quad (8)$$

In step ST407, the control unit 10 controls opening and closing of the first drain valve 11 to the third drain valve 13 such that an actual drain flow rate $Q_d$ of the concentrated water W3 becomes the target drain flow rate $Q_d'$ calculated in step ST406. Accordingly, the process of the present flowchart ends (the process returns to step ST401).

According to the reverse osmosis membrane separation device 1 according to the first embodiment, the following effect is obtained, for example.

In the reverse osmosis membrane separation device 1 according to the first embodiment, the control unit 10 calculates the drive frequency F of the pressure pump 2 by the velocity type digital PID algorithm, such that the detected flow rate value $Q_p$ that is output from the flow rate sensor 6 becomes the target flow rate value $Q_p'$ that is set in advance, and outputs a current value signal corresponding to a calculation value of the drive frequency F to the inverter equipment 3.

In the velocity type digital PID algorithm, a change portion from a manipulated value calculated last time is calculated, and the last manipulated value is added to this. Therefore, even when the detected flow rate value $Q_p$ is a discrete value, a deviation from the target flow rate value $Q_p'$ can be offset at a high speed. Accordingly, even when a water permeability coefficient of the RO membrane, module 5 changes rapidly, it is possible to sufficiently follow this change. Therefore, when a water permeability coefficient of the RO membrane module 5 changes rapidly, it is possible to keep the flow rate of the permeate water W2 at the target flow rate value $Q_p'$, by suppressing a large deviation of the flow rate of the permeate water W2 from the target flow rate value $Q_p'$. According to the first embodiment, it is possible to provide a reverse osmosis membrane separation device 1 that can keep a flow rate of permeate water at a target flow rate value, even when a water permeability coefficient of an RO membrane module rapidly changes.

In the reverse osmosis membrane separation device 1 according to the first embodiment, the control unit 10 calculates the instantaneous flow rate $Q_i$ based on the time width W of the pulse signal output from the flow rate sensor 6 and the flow rate value α per one pulse set in advance. The reverse osmosis membrane separation device 1 averages two values after subtracting maximum-side two values and minimum-side two values from the calculated nearest six instantaneous flow rates $Q_i$ (sample values), and uses a numerical value obtained by this averaging process, as the detected flow rate value $Q_p$.

According to the averaging process, even when an abnormal value (an extremely long value or short value as compared with other values) occurs in the time width W of a pulse signal due to disturbance of noise and the like, a calculation value of the instantaneous flow rate $Q_i$ based on the extreme abnormal value is excluded from the sample values. Therefore, even when an abnormal value occurs in the time width W of a pulse signal, a large deviation of an actual flow rate of the permeate water W2 from the target flow rate value $Q_p'$ can be suppressed. Consequently, the actual flow rate of the permeate water W2 can be stably held at the target flow rate value $Q_p'$.

In the reverse osmosis membrane separation device 1 according to the first embodiment, the control unit 10 performs the temperature feedforward recovery rate control.

Therefore, the reverse osmosis membrane separation device 1 can securely suppress precipitation of a silica scale in the RO membrane module 5, while maximizing a recovery rate of the permeate water W2.

Second Embodiment

Figure 6:
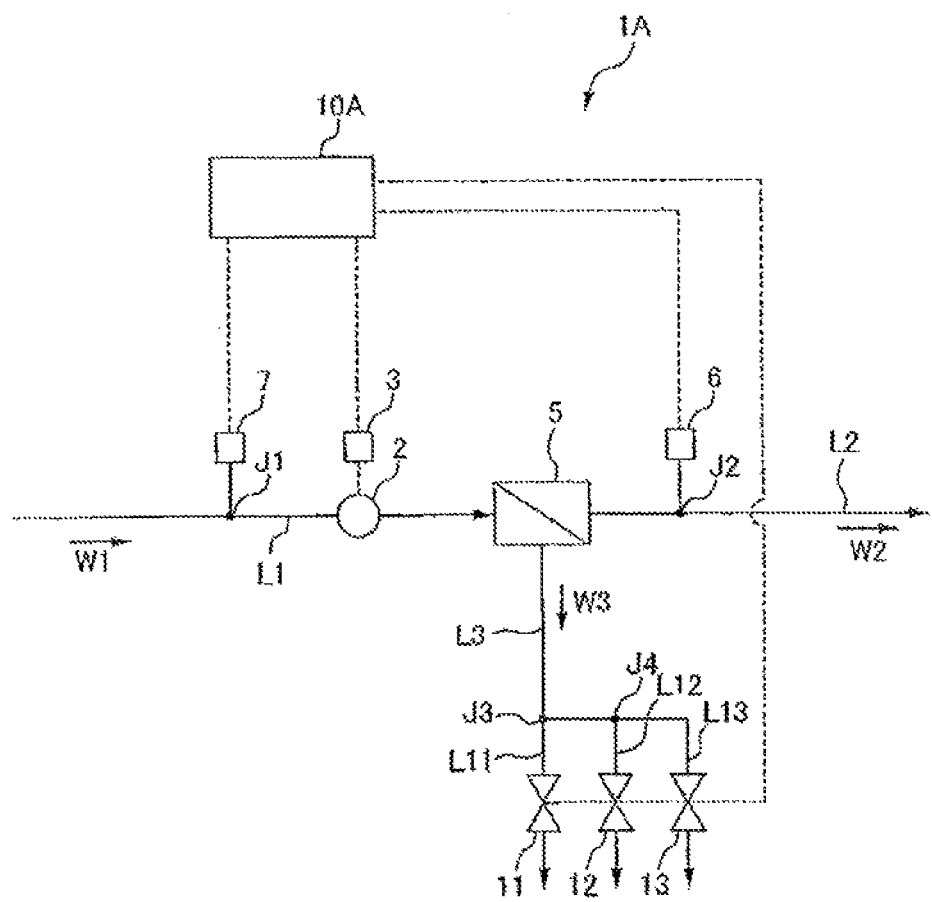
FIG. 6 is an exemplary overall configuration diagram of a reverse osmosis membrane separation device according to a second, embodiment of the present invention.

A configuration of a reverse osmosis membrane separation device 1A according to a second embodiment of the present invention is described next with reference to FIG. 6. FIG. 6 is an overall configuration diagram of the reverse osmosis membrane separation device 1A according to the second embodiment. In the second embodiment, differences from the first embodiment are mainly described. In a description of the second embodiment, configurations that are the same as or equivalent to those in the first embodiment are assigned with the same reference numerals or symbols. In the second embodiment, a description redundant with that of the first embodiment is suitably omitted.

As shown in FIG. 6, the reverse osmosis membrane separation device 1A according to the second embodiment includes the pressure pump 2, the inverter equipment 3, the RO membrane module 5, the flow rate sensor 6, a hardness sensor 7 as a hardness measuring unit, a control unit 10A, and the first drain valve 11 to the third drain valve 13.

The hardness sensor 7 is a device that measures calcium hardness (a calcium carbonate conversion value) of the supply water W1 that passes through the supply water line L1. The hardness sensor 7 is connected to the supply water line L1 at the junction portion J1. The junction portion J1 is arranged between a supply source (not shown) of the supply water W1 and the pressure pump 2. The hardness sensor 7 is electrically connected to the control unit 10A. Calcium hardness (hereinafter, also a "measured hardness value") of the supply water W1 measured by the hardness sensor 7 is transmitted to the control unit 10A as a detection signal.

The control unit 10A is configured by a microprocessor (not shown) that includes a CPU and a memory. The control unit 10A performs a flow rate feedback water volume control, (see FIG. 4) by the velocity type digital PID algorithm in a similar manner to that of the control unit 10 in the first embodiment.

The control unit 10A according to the present embodiment performs a recovery rate control of the permeate water W2, based on hardness of the supply water W1 (hereinafter, also "water quality feedforward recovery rate control"). The water quality feedforward recovery rate control is performed in parallel with the flow rate feedback water volume control.

Figure 7:
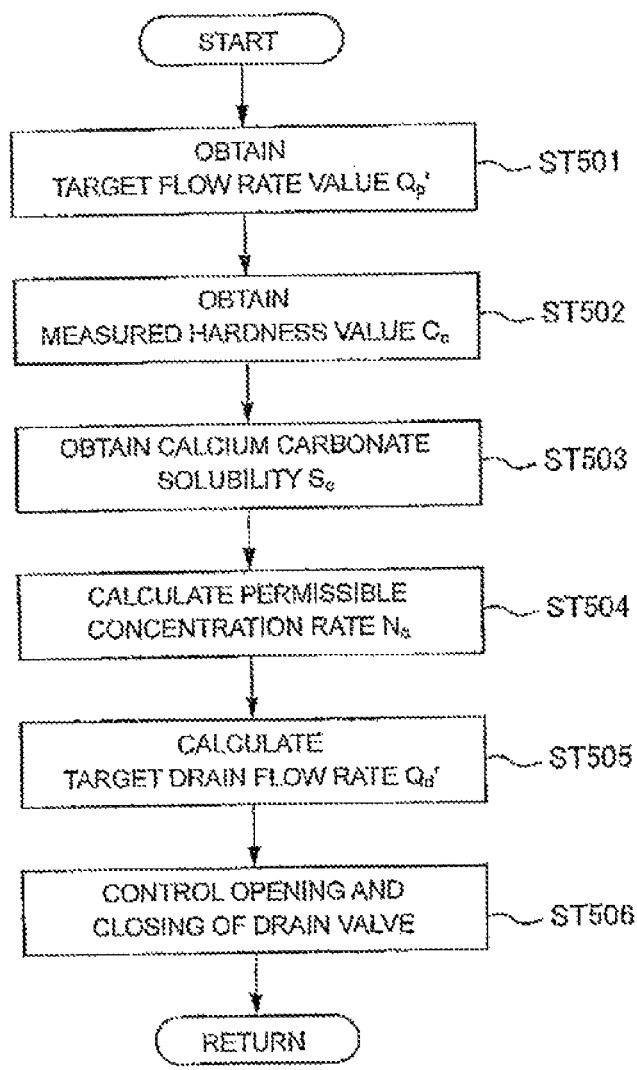
FIG. 7 is an exemplary flowchart showing a processing procedure employed when the control unit performs a water quality feedforward recovery rate control in the second embodiment.

The water quality feedforward recovery rate control by the control unit 10A is described next. FIG. 7 is a flowchart showing a processing procedure employed when the control unit 10A performs the water quality feedforward recovery rate control. The process of the flowchart shown in FIG. 7 is repeatedly performed during an operation of the reverse osmosis membrane separation device 1A.

In step ST501 shown in FIG. 7, the control unit 10A obtains the target flow rate value $Q_p'$ of the permeate water W2. The target, flow rate value $Q_p'$ is a set value that the system manager inputs to the memory via the user interface (not shown), for example.

In step ST502, the control unit 10A obtains a measured hardness value $C_c$ of the supply water W1 measured by the hardness sensor 7.

In stop ST503, the control unit 10A obtains calcium carbonate solubility $S_c$ in water. The calcium carbonate solubility $S_c$ is a set value that the system manger inputs to the memory via the user interface (not shown), for example. The calcium carbonate solubility in water can be regarded as substantially constant during a normal operation temperature (5 to 35° C.)

In step ST504, the control unit 10A calculates a permissible concentration rate $N_c$ of calcium carbonate in the concentrated water W3, based on the measured hardness value $C_c$ and the calcium carbonate solubility $S_c$ that are obtained in the preceding step. The permissible concentration rate $N_c$ of calcium carbonate can be obtained by the following Equation (9).

$$N_c = S_c/C_c \qquad (9)$$

For example, when the measured hardness value $C_c$ is 3 mgCaCO$_3$/L and also when the calcium carbonate solubility $S_c$ at 25° C. is 15 mgCaCO$_3$/L, the permissible concentration rate $N_c$ becomes "5".

In step ST505, the control unit 10A calculates a drain flow rate (target drain flow rate $Q_d'$) at which a recovery rate becomes a maximum, based on the target flow rate value $Q_p'$ and the permissible concentration rate $N_c$ that are obtained or calculated in the preceding step. The target drain flow rate $Q_d'$ can be obtained by the following Equation (10).

$$Q_n' = Q_p'/(N_n-1) \qquad (10)$$

In step ST506, the control unit 10A controls opening and closing of the first drain valve 11 to the third drain valve 13 such that an actual drain flow rate $Q_d$ of the concentrated water W3 becomes the target drain flow rate $Q_d'$ calculated in step ST505. Accordingly, the process of the present flowchart ends (the process returns to step ST501).

In the reverse osmosis membrane separation device 1A according to the second embodiment, the control unit 10A performs a flow rate feedback water volume control of the permeate water W2 by the velocity type digital PID algorithm. Therefore, effect similar to that of the first embodiment is obtained. In the reverse osmosis membrane separation device 1A according to the second embodiment, the control unit 10A performs the water quality feedforward recovery rate control. Therefore, the reverse osmosis membrane separation device 1A can securely suppress precipitation of a calcium carbonate scale in the RO membrane module 5, while maximizing a recovery rate of the permeate water W2.

Third Embodiment

Figure 8:
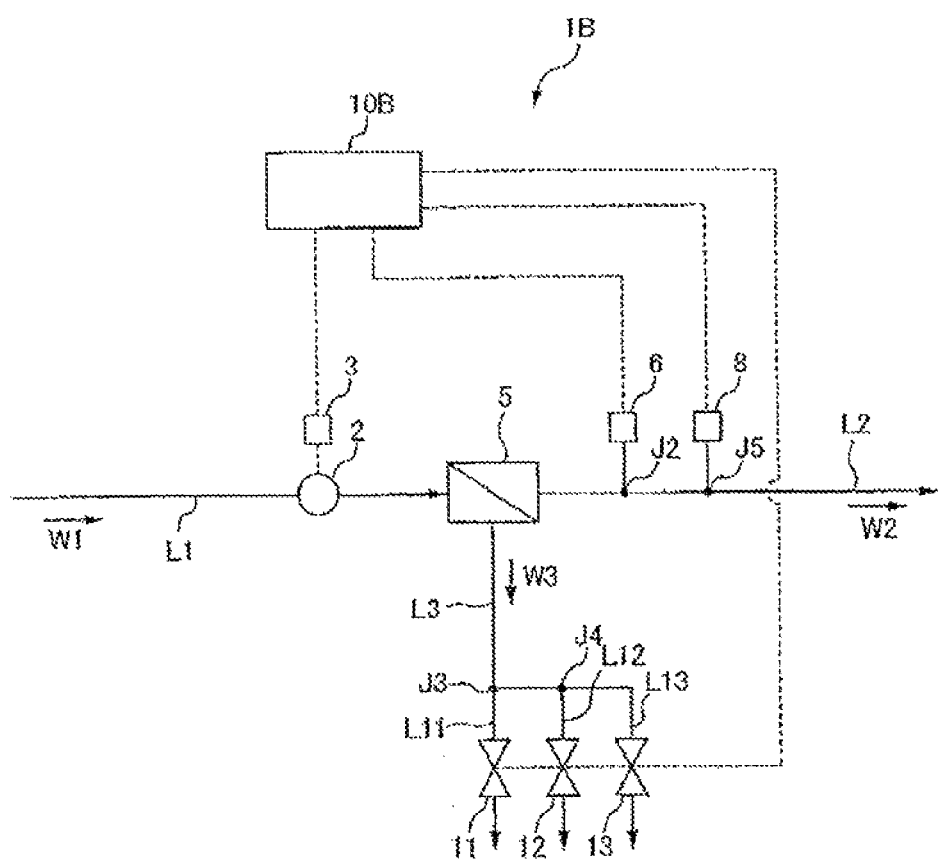
FIG. 8 is an exemplary overall configuration diagram of a reverse osmosis membrane separation device according to a third embodiment of the present invention.

A configuration of a reverse osmosis membrane separation device 1B according to a third embodiment of the present invention is described next with reference to FIG. 8. FIG. 8 is an overall configuration diagram of the reverse osmosis membrane separation device 1B according to the third embodiment. In the third embodiment, differences from the first embodiment are mainly described. In a description of the third embodiment, configurations that are the same as or equivalent to those in the first embodiment are assigned with the same reference numerals or symbols. In the third embodiment, a description redundant with that of the first embodiment is suitably omitted.

As shown in FIG. 3, the reverse osmosis membrane separation device 1B according to the third embodiment includes the pressure pump 2, the inverter equipment 3, the RO membrane module 5, the flow rate sensor 6, an electric conductivity sensor 8 as an electric conductivity measuring unit, a control unit 10B, and the first drain valve 11 to the third drain valve 13.

The electric conductivity sensor 8 is a device that measures electric conductivity of the permeate water W2 that passes through the permeate water line L2. The electric conductivity sensor 8 is connected to the permeate water line L2 at the junction portion J5. The electric conductivity sensor 8 is electrically connected to the control unit 103. Electric conductivity (hereinafter, also a "measured electric conductivity value") of the permeate water W2 measured by the electric conductivity sensor 8 is transmitted to the control unit 10B as a detection signal.

The control unit 10B is configured by a microprocessor (not shown) that includes a CPU and a memory. The control unit 10B performs the flow rate feedback water volume control (see FIG. 4) by the velocity type digital PID algorithm, in a similar manner to that of the control unit 10 in the first embodiment.

The control unit a 10B in the present embodiment performs a recovery rate control of the permeate water W2 (hereinafter, also "water quality feedback recovery rate control"), based on the electric conductivity of the permeate water W2. The water quality feedback recovery rate control is performed in parallel with the flow rate feedback water volume control.

Figure 9:
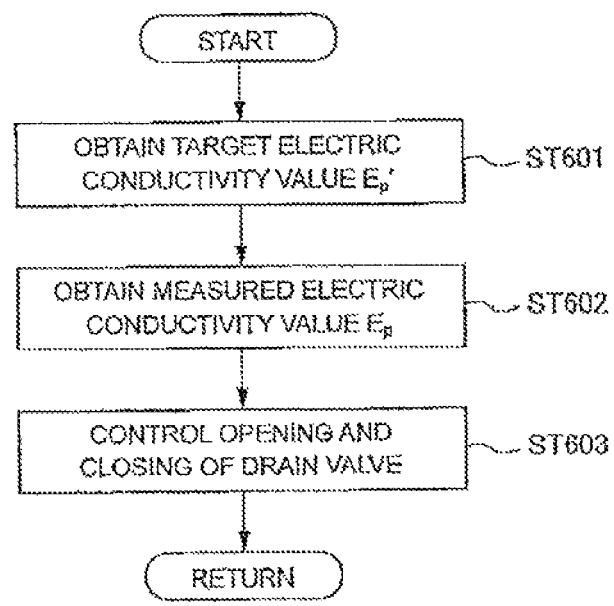
FIG. 9 is an exemplary flowchart showing a processing procedure employed when the control unit performs a water quality feedback recovery rate control in the third embodiment.

The water quality feedback recovery rate control by the control unit 10B is described next. FIG. 9 is a flowchart showing a processing procedure employed when, the control unit 10B performs the water quality feedback recovery rate control. The process of the flowchart shown in FIG. 9 is repeatedly performed during an operation of the reverse osmosis membrane separation device 1B.

In step ST601 shown in FIG. 9, the control unit 10B obtains a target electric conductivity value $E_p'$ of the permeate water W2. The target electric conductivity value $E_p'$ is an index of purity that is required in the permeate water W2. The target electric conductivity value $E_p'$ is a set value that the system manager inputs to the memory via the user interface (not shown), for example.

In step ST602, the control unit 108 obtains a measured electric conductivity value $E_p$ of the permeate water W2 measured by the electric conductivity sensor 8.

In step ST603, the control unit 10B controls opening and closing of the first drain valve 11 to the third drain valve 13, such that a deviation between the measured electric conductivity value (feedback value) $E_p$ that is obtained in step ST602 and the target electric conductivity value $E_p'$ that is obtained in step ST601 becomes zero. That is, by increasing and decreasing at stages the drain flow rate of the concentrated water W3, concentration of dissolved salt on a membrane surface is changed such that the permeate water W2 of required purity is obtained. Accordingly, the process of the present flowchart ends (the process returns to step ST601).

In the reverse osmosis membrane separation device 1B according to the third embodiment, the control unit 10B performs the flow rate feedback water quality control of the permeate water W2. Therefore, effect similar to that of the first embodiment is obtained. In the reverse osmosis membrane separation device 1B according to the third embodiment, the control unit 10B performs the water quality feedback recovery rate control. Therefore, in the reverse osmosis membrane separation device 1B, a recovery rate of the permeate water W2 can be increased to a maximum, while satisfying a water quality required for the permeate water W2.

The preferred embodiments of the present invention are described above. However, the present invention is not limited to the above embodiments, and can be performed by various modes.

In the first embodiment, an example of detecting a temperature of the supply water W1 in the temperature feedforward recovery rate control is described, for example. Alternatively, a temperature of the permeate water W2 or the concentrated water W3 that is obtained in the RO membrane module 5 may be detected, for example.

In the second embodiment, in the water quality feedforward recovery rate control, an example of calculating a drain flow rate at which a recovery rate becomes a maximum is described based on the permissible concentration rate of calcium carbonate and the target flow rate value of the permeate water W2. Alternatively, the following method may be employed. That is, the permissible concentration rate $N_c$ of calcium carbonate and the permissible concentration rate $N_s$ of silica are compared, and a smaller permissible concentration rate is selected. Based on the selected permissible concentration rate and the target flow rate value of the permeate water W2, a drain flow rate at which a recover rate becomes a maximum is calculated.

In step ST207 in the first embodiment (FIG. 3), an example is described that the control unit 10 samples nearest six calculation values including the latest instantaneous flow rates $Q_i$ as sample values, and averages two values, after subtracting maximum-side two values and minimum-side two values. Alternatively, the control unit 10 may be arranged to sample nearest eight calculation values including latest instantaneous flow rates $Q_i$ as sample values, and average three values, after subtracting maximum-side three values and minimum-side two values. That is, the control unit 10 can be arranged to use calculation values of nearest n instantaneous flow rates as sample values, and average (n−j−k) values, after subtracting maximum-side (J≥1) values and minimum-side k (k≥1) values. The values of n, j, k can be suitably set.

In the first to third embodiments, a concentrated water reflux line for refluxing a part of the concentrated water W3 that passes through the concentrated water line L3 to an upstream side of the pressure pump 2 in the supply water line L1 may be provided. By providing the concentrated water reflux line, a flow velocity on a membrane surface can be increased, and therefore, the occurrence of fouling can be suppressed.

In the first to third embodiments, the supply water W1 may be raw water such as groundwater and tap water. The supply water W1 may be water that is obtained by carrying out preprocess to raw water by an iron-removal and manganese-removal device, an activated-carbon filtering device, or a water softening device.

In the first to third embodiments, in each recovery rate control, examples of adjusting at stages a drain flow rate of the concentrated water W3 by selectively opening and closing the first drain valve 11 to the third drain valve 13 are described. Alternately, the drain line may be one without being branched. A proportional control valve may be provided in this line. In this case, a drain flow rate of the concentrated water W3 can be adjusted by controlling a valve aperture by transmitting a current value signal (4 to 20 mA, for example) from the control unit 10 (10A, 10B) to the proportional control valve.

In a configuration in which the proportional control valve is provided, a flow rate sensor may be provided in the drain line. A flow rate value that is detected by the flow rate sensor is input to the control unit 10 (10A, 10B) as a feedback value. Accordingly, an actual drain flow rate of the concentrated water W3 can be controlled more accurately.

What is claimed is:
1. A reverse osmosis membrane separation device comprising:
a reverse osmosis membrane module configured to separate supply water into permeate water and concentrated water;

a supply water line for supplying supply water to the reverse osmosis membrane module;

a pressure pump configured to be driven at a rotation speed corresponding to an input drive frequency and to pressure feed supply water which passes through the supply water line to the reverse osmosis membrane module;

an inverter equipment configured to output a drive frequency corresponding to an input frequency instruction signal to the pressure pump;

a permeate water line for sending the permeate water from the reverse osmosis membrane module;

a first flow rate sensor configured to detect a flow rate of the permeate water to output a detected flow rate value corresponding to the flow rate;

a concentrated water line for sending the concentrated water from the reverse osmosis membrane module;

a drain water line branching from the concentrated water line, to drain a part of the concentrated water outward of the reverse osmosis membrane separation device;

a proportional control valve disposed on the drain water line and adjusting a drain flow rate of the concentrated water;

a second flow rate sensor disposed on the drain water line and detecting the drain flow rate of the concentrated water;

a return water line branching from the drain water line and connected to the supply water line at an upper stream of the pressure pump, the return water line returning a remaining concentrated water to the supply water line;

a temperature sensor detecting temperature of the supply water, the permeate water, or the concentrated water; and a control unit including a permeate water flow rate controller and a permeate water recovery rate controller, wherein the permeate water flow rate controller is configured to (i) calculate a drive frequency of the pressure pump by a velocity type digital PID algorithm, such that a detected flow rate value output from the first flow rate sensor becomes a target flow rate value that is set in advance, and (ii) output the frequency instruction signal corresponding to a calculation value of the drive frequency to the inverter equipment to drive the pressure pump at a rotation speed corresponding to the drive frequency, and the permeate water recovery rate controller is configured to (i) calculate permissible concentration rate of silica in the concentrated water, based on silica concentration of supply water obtained in advance and silica solubility determined by a detected temperature value detected by the temperature sensor, (ii) calculate the drain flow rate from a calculation value of the permissible concentration rate and the target flow rate value of the permeate water, and (iii) adjust opening of the proportional control valve such that a detected flow rate value output from the second flow rate sensor becomes a calculation value of the drain flow rate.

2. The reverse osmosis membrane separation device according to claim 1, wherein the first flow rate sensor is configured to output a pulse signal having a time width that is proportional to a flow velocity of permeate water, the control unit includes an integrated timer unit, and the permeate water flow rate controller is configured to (i) measure a time width of the pulse signal output from the first flow rate sensor using the integrated timer unit, (ii) calculate an instantaneous flow rate based on the time width of the pulse signal and a flow rate value per one pulse that is set in advance, and (iii) use calculation values of nearest n instantaneous flow rates as sample values, average (n−j−k) values, after subtracting maximum-side j (j≥1) values and minimum-side k (k≥1) values, and use a numerical value obtained by the averaging process as a detected flow rate value of the first flow rate sensor.

3. The reverse osmosis membrane separation device according to claim 1, further comprising a silica concentration sensor, wherein the permeate water flow rate controller is configured to (i) calculate the drive frequency of the pressure pump by the velocity type digital PID algorithm, such that a detected flow rate value Qp output from the first flow rate sensor becomes a target flow rate value Qp' that is set in advance, and (ii) output the frequency instruction signal corresponding to the calculation value of the drive frequency to the inverter equipment to drive the pressure pump at the rotation speed corresponding to the drive frequency, and the permeate water recovery rate controller is configured to (i) calculate the permissible concentration rate of silica Ns in the concentrated water according to an equation (1), based on silica concentration Cs of supply water measured by the silica concentration sensor and silica solubility Ss determined by a detected temperature value detected by the temperature sensor, (ii) calculate the drain flow rate Qd' from the calculation value of the permissible concentration rate Ns and the target flow rate value Qp' of permeate water according to equation (2), and (iii) adjust opening of the proportional control valve such that the detected flow rate value Qd output from the second flow rate sensor becomes the calculation value Qd' of the drain flow rate, where $$Ns = Ss/Cs \quad \text{(equation 1)}$$

$$Qd' = Qp'/(Ns-1) \quad \text{(equation 2)}.$$

* * * * *